United States Patent [19]

Swanson

[11] 3,708,422

[45] Jan. 2, 1973

[54] ELECTRIC DISCHARGE MACHINING FLUID

[75] Inventor: John W. Swanson, Yardley, Pa. 19067

[73] Assignee: Cities Service Oil Co.

[22] Filed: Jan. 29, 1971

[21] Appl. No.: 111,115

[52] U.S. Cl. ............. 252/49.6, 252/50, 252/51.5 R
[51] Int. Cl. ..................... C10m 1/32, C10m 1/50
[58] Field of Search .............. 252/50, 51.5 R, 49.6

[56] References Cited

UNITED STATES PATENTS

| | | | |
|---|---|---|---|
| 1,888,023 | 11/1932 | Adams | 252/50 |
| 2,234,096 | 3/1941 | Teter et al. | 252/50 |
| 2,758,086 | 8/1956 | Stuart | 252/50 X |
| 2,832,741 | 4/1958 | Gottshall et al. | 252/50 |
| 3,493,512 | 2/1970 | Trites | 252/50 X |
| 3,043,783 | 7/1962 | Hatcher et al. | 252/51.5 R |
| 3,047,501 | 7/1962 | Brook et al. | 252/50 X |

OTHER PUBLICATIONS

Zimmermann & Levine, Handbook of Material Trade Names, 1953 (TP151,Z5).

Primary Examiner—Daniel E. Wyman
Assistant Examiner—W. J. Shine
Attorney—J. Richard Geaman

[57] ABSTRACT

An improved electric discharge machining fluid permitting rapid removal of metal, particularly in the case of difficulty machined cast iron. The electric discharge machining fluid comprises a major proportion of an oil and a minor proportion of an oil-soluble aliphatic amine containing about 10 to 50 carbons. The preferred electric discharge machining fluid comprises a hydrocarbon oil and an oil-soluble aliphatic primary monoamine containing about 12 to 25 carbons.

7 Claims, No Drawings

ELECTRIC DISCHARGE MACHINING FLUID

BACKGROUND OF THE INVENTION

In the electric discharge machining process, hereinafter referred to as the EDM process, two electrodes, i.e., the cutting tool and the work piece, are placed close to each other, a direct current is applied, and a spark of electrical energy jumps the gap between the electrodes. The electrodes are submerged in and/or flushed with a dielectric fluid. The cutting tool is generally referred to as the electrode and is usually the negatively charged cathode. The work piece is usually the anode. However, in some situations the machining takes place under "reverse polarity" conditions wherein the work piece becomes the cathode while the cutting tool becomes the anode. Common electrode materials are graphite, copper-graphite, copper, brass, tungsten, tungsten alloys, aluminum alloys, and zinc alloys.

In electric discharge machining, metal is removed or eroded from the work piece because of the heat generated during the electrical discharge, i.e., arc. The time of a single arc is in the order of 1 to 200 microseconds. As soon as the arc begins, the work piece metal and the EDM fluid in the area of the electric discharge vaporize. A gas bubble is formed which contains vapors of EDM fluid, work piece, and, to a lesser extent, some electrode material. The work piece metal in the area of the arc begins to boil and continues to boil until an empty crater is left. Heat is continuously removed throughout the cutting process by the EDM fluid to prevent overheating of tool and work piece. The total cutting process is a series of thousands of these crater formations and is slower than conventional cutting techniques. The speed and ease of the EDM process vary according to the metal being machined. Cast iron is a metal that is notoriously difficult to machine by electric discharge machining.

A unique feature of EDM is the "overcut." This is due to an electronic cloud that surrounds the electrode and gives a cut larger than the dimensions of the electrode. The size of this overcut is determined by the current, the frequency, and the capacitance. The overcut can be predetermined so that tolerances of 0.0001 inch are possible on machined pieces.

Examples of fluids which are useful for electric discharge machining are petroleum oils, silicones, kerosene, water and glycols. The primary functions of the EDM fluid are:

1. to flush the eroded debris from the arc gap,
2. to provide an insulating dielectric barrier between the electrode and the work piece,
3. to provide a contaminated or ionized medium to allow a discharge when desired,
4. to quench the liquid or vapor machining debris to prevent their build-up, and
5. to cool the electrode and work piece to prevent excessive wear and overcut.

Flushing the debris from the arc gap is one of the most important functions of the EDM fluid. If debris builds up in the arc gap, a bridge can form between the electrode and the work piece. If a bridge forms, current will flow at a steady rate rather than via discharge, so metal removal will cease. Another detrimental effect of debris build-up is to increase the overcut. If a layer of debris remains on the surface of the work piece, the arc will occur between the electrode and the debris, resulting in the removal of too much of the work piece material. The amount of extra overcut would be equal to the thickness of the layer of debris.

The fluid is an insulating medium in that it does not allow a continuous flow of current. Rather, it allows the pulsing current produced by the power supply to travel between the electrode and the work piece in a distinct spark discharge.

Almost opposed to this insulating property, the fluid also forms a conducting channel to allow the spark to discharge. This conducting channel can be due to the impurities and machining debris in the fluid or to the local ionization of the fluid itself.

During machining, vapors or droplets of material are discharged from the work piece. The EDM fluid quenches this debris into the solid state. Otherwise, the liquid and gaseous work piece debris would build up on the electrode altering the electrical balance of the system and changing the dimensions of the electrode, and consequently, the dimensions of the cut.

The electrode and the work piece are also cooled by the fluid during machining. This prevents larger areas from being heated to their boiling point and forming larger craters than desired. This reduces electrode wear and extra overcut on the work piece.

In order to improve the performance of EDM fluid, various additives may be employed to reduce the rate of oil degradation; to improve debris removal; to improve the metal removal index, i.e., enhance the metal removal rate; to permit easy removal of metal fines; and to stabilize the electrical properties of the fluid. Care must be taken that the additive does not possess undesirable properties such as reducing the metal removal index and forming gums and sludge on the electrode.

SUMMARY OF THE INVENTION

It is an object of this invention to provide an EDM fluid having an improved metal removal index, particularly in the electric discharge machining of cast iron.

It is another object of this invention to provide an EDM fluid having a prolonged useful life.

It is yet another object of this invention to provide an EDM fluid having excellent flushing action to thereby remove machining debris from the arc gap.

It is still another object of this invention to provide an EDM fluid which provides an improved insulating barrier to protect against premature discharge while at the same time providing the necessary conditions to allow a spark discharge when desired.

Still other objects will appear hereinafter.

The foregoing objects are attained according to my invention. Generally, this invention consists of an electric discharge machining fluid composition comprising:

a. a major proportion of an oil; and
b. a minor proportion of an oil-soluble aliphatic amine having about 10 to 50 carbons.

By proceeding according to my invention it is possible to obtain an EDM fluid possessing such desirable properties as excellent flushing characteristics, prolonged useful life, and excellent metal removal index. The EDM fluid of my invention is particularly useful in machining difficultly machined cast iron. By using the EDM fluid of my invention, cast iron can be machined by electric discharge machining processes at a rate heretofore not attainable.

DETAILED DESCRIPTION

This invention is concerned with improved electric discharge machining fluids having prolonged useful life, excellent flushing characteristics, and superior metal removal indexes. The EDM fluids of this invention comprise a major proportion of an oil and a minor proportion of an oil-soluble aliphatic amine having about 10 to 50 carbons. The oil component of the EDM fluid may be either a silicone oil or a hydrocarbon oil, but hydrocarbon oils are generally preferred. Examples of suitable hydrocarbon oils are kerosene, fuel oils, and lubricating oils. In the case of hydrocarbon lubricating oils, they may be aromatic, naphthenic, paraffinic, or various mixtures of aromatic, naphthenic, and paraffinic hydrocarbons. A particularly preferred oil is a paraffinic lubricating oil having a viscosity of about 35 to 50, and most preferably a viscosity of about 40 to 45, SUS at 100° F.

The oil-soluble aliphatic amine component of the EDM fluid of my invention contains about 10 to 50 carbons. It has been found that amines having less than about 10 carbons are not sufficiently soluble in the oil. It is preferred that the amine contain about 12 to 25 carbons. The aliphatic amine may be either saturated or unsaturated. While primary, secondary, and tertiary amines are efficacious in the practice of my invention, primary amines are preferred. Aliphatic polyamines are useful, but monoamines are preferred. The preferred amine, therefore, is an oil-soluble aliphatic primary monoamine containing about 12 to 25 carbons. The amine component of the EDM fluid of my invention may be a distinct compound or it may be a mixture of amines.

Examples of suitable amines are n-dodecylamine; n-pentadecylamine; n-eicosylamine; n-pentacosylamine; 1-triacontylamine; oleylamine; 1,25-diaminopentacosane; 1,12-diaminododecane; 1,15-diaminooctadecene1; ethyldodecylamine; didecylamine; vinyleicosylamine; eicosyltriacontylamine; butyloleylamine; tributylamine; methyldioleylamine; trihexylamine; and mixtures thereof. A particularly preferred amine is a mixture of hexadecylamine, octadecylamine, and octadecenylamine manufactured by Armour Chemical Company under the trademark Armeen HT.

The EDM fluid composition of my invention comprises a major proportion of an oil and a minor proportion of an oil-soluble aliphatic amine having about 10 to 50 carbons and preferably about 12 to 25 carbons. The concentration of the amine in the EDM fluid composition is generally within the range of about 0.001 to 1.0 weight percent, based on the total EDM fluid composition. The preferred amine concentration is within the range of about 0.1 to 0.9 weight percent, based on the total EDM fluid composition.

In addition to the aliphatic amine, the EDM fluid of my invention may contain other additives such as antioxidants and metal deactivators. For example, when the EDM fluid composition is based on a hydrocarbon oil, it has been found to be advantageous to incorporate 2,6-di-tert-butyl-4-methylphenol as an antioxidant and N,N'-disalicylidine-1,2-propanediamine as a metal deactivator. A particularly efficacious EDM fluid composition comprises a major proportion of a paraffinic hydrocarbon oil; about 0.05 to 2.0 weight percent, and preferably about 0.2 to 0.7 weight percent, of 2,6-di-tert-butyl-4-methylphenol; about 0.001 to 0.1 weight percent, and preferably about 0.02 to 0.08 weight percent, of N,N'-disalicylidine-1,2-propanediamine; and about 0.001 to 1.0 weight percent, and preferably about 0.1 to 0.9 weight percent, of an oil-soluble aliphatic amine having about 10 to 50, and preferably about 12 to 25, carbons. All of the foregoing weight percents are based on the total EDM fluid composition. An especially useful EDM fluid composition comprises a major proportion of a paraffinic hydrocarbon oil having a viscosity of about 35-50 SUS at 100° -disalicylidine- about 0.3 weight percent based on the total composition of 2,6-di-tert-butyl-4-methylphenol; about 0.05 weight percent based on the total composition of N,N'-disalicylidine- 1,2-propanediamine; and about 0.8 weight percent based on the total composition of Armeen HT which is a mixture of oil-soluble hexadecylamine, octadecylamine, and octadecenylamine.

The EDM fluid compositions of my invention exhibit a prolonged useful life. For example, when hydrocarbon EDM fluid compositions of my invention are subjected to the ASTM d-943 oxidation test, they are found to have useful lives of about 1,000 to 1,500 hours, or about 5 to 10 times the useful life of the corresponding hydrocarbon oil alone. In addition, the EDM fluid compositions of my invention have excellent flushing characteristics and unexpectedly high metal removal rates, particularly in the case of difficulty machined metals such as cast iron.

The following specific example will serve to further illustrate my invention.

EXAMPLE

An EDM fluid composition according to my invention is prepared by incorporating into a paraffinic hydrocarbon oil having a viscosity of about 35-50 SUS at 100° F minor quantities of 2,6-di-tert-butyl-4-methylphenol; N,N'-disalicylidine-1,2-propanediamine; and Armeen HT, a mixture of oil-soluble hexadecylamine, octadecylamine, and octadecenylamine. The EDM fluid composition has the following make-up wherein all weight percents are based on the overall composition.

| | weight percent |
|---|---|
| paraffinic hydrocarbon oil | 98.85 |
| 2,6-di-tert-butyl-4-methylphenol | 0.3 |
| N,N'-disalicylidine-1,2-propanediamine | 0.05 |
| Armeen HT | 0.8 |

The above inventive EDM fluid composition is used in machining both tool steel and cast iron. For comparison, a commercially available EDM fluid is used in machining tool steel and cast iron under the same conditions, and the unmodified paraffinic hydrocarbon oil component of the inventive EDM fluid composition is also used to machine tool steel under the same conditions as are employed in the case of the inventive EDM fluid composition. The efficacy of each EDM fluid is reported as the metal removal index. The metal removal index is directly proportional to the metal removal rate wherein the higher the value of the metal removal index the higher is the metal removal rate. The results are in the following table.

| EDM Fluid | Metal Removal Index | |
|---|---|---|
| | Tool Steel | Cast Iron |
| Inventive EDM Fluid | 8.67 | 5.73 |
| Unmodified Paraffinic Hydrocarbon Oil | 6.65 | |
| Commercial EDM Fluid | 5.00 | 3.25 |

The foregoing data illustrate the superior metal removal rate of the EDM fluid composition of my invention relative to that of the unmodified paraffinic hydrocarbon oil component and to that of the commercially available EDM fluid. In fact, the EDM fluid composition of my invention exhibits a faster metal removal rate for the difficultly machined cast iron than the commercial EDM fluid exhibits for the relatively easily machined tool steel. In addition, the inventive EDM fluid described above has the unexpectedly long useful life of 1,000 hours as determined by the ASTM D-943 oxidation test.

Useful EDM fluid compositions within the scope of my invention may be prepared using other classes of amines than the foregoing aliphatic primary monoamines, e.g., aliphatic polyamines, aliphatic secondary amines, and aliphatic tertiary amines. While oil-soluble aliphatic amines having about 10 to 50 carbons may be used, the preferred amines are oil-soluble aliphatic primary monoamines having about 12 to 25 carbons. Although the EDM fluid composition exemplified above contains an antioxidant and a metal deactivator, satisfactory EDM fluid compositions comprising only an oil and the amine may be prepared. The concentration of the amine in the EDM fluid composition is not critical and the optimum concentration may readily be determined by those skilled in the art. However, a concentration of about 0.001 to 1.0 weight percent, and preferably about 0.1 to 0.9 weight percent, based on the overall composition is generally found to give excellent results. The oil component of my EDM fluid composition may be a silicone or a hydrocarbon, but hydrocarbon oils are usually preferable.

It is understood that many modifications and variations can be practiced without departing from the scope of the current invention as defined in the appended claims.

What is claimed is:

1. In an electric discharge machining process wherein a work piece and a cutting tool are bathed by an electric discharge machining fluid and a direct current is applied across said work piece and said cutting tool, the improvement which comprises using as the electric discharge machining fluid a composition comprising:
   a. a major proportion of an oil selected from the group consisting of silicone oils and hydrocarbon oils; and
   b. metal removal index improving amount of an oil-soluble aliphatic amine having about 10 to 50 carbons.

2. The process of claim 1 wherein the oil is a hydrocarbon oil.

3. The process of claim 2 wherein the amine has about 12 to 25 carbons.

4. The process of claim 3 wherein the amine is a primary monoamine.

5. The process of claim 4 wherein the composition contains in addition an antioxidant and a metal deactivator.

6. The process of claim 1 wherein the electric discharge machining fluid composition comprises a major proportion of a hydrocarbon oil; about 0.05 to 2.0 weight percent based on the overall composition of 2,6-di-tert-butyl-4-methylphenol; about 0.001 to 0.1 weight percent based on the overall composition of N,N'disalicylidine-1,2-propanediamine; and about 0.001 to 1.0 weight percent based on the overall composition of a mixture of hexadecylamine, octadecylamine, and octadecenylamine.

7. The process of claim 1 wherein the electric discharge machining fluid composition comprises a major proportion of a paraffinic hydrocarbon oil having a viscosity of about 35–50 SUS at 100° F; about 0.3 weight percent based on the overall composition of 2,6-di-tert-butyl-4-methyl-phenol; about 0.05 weight percent based on the overall composition of N,N'-disalicylidine-1,2-propanediamine; and about 0.8 weight percent based on the overall composition of a mixture of hexadecylamine, octadecylamine, and octadecenylamine.

* * * * *